US008328401B2

(12) United States Patent
Matsunaga

(10) Patent No.: US 8,328,401 B2
(45) Date of Patent: Dec. 11, 2012

(54) VEHICLE LAMP INCLUDING HOLDING MEMBER

(75) Inventor: Takashi Matsunaga, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 560 days.

(21) Appl. No.: 12/574,233

(22) Filed: Oct. 6, 2009

(65) Prior Publication Data

US 2010/0085770 A1 Apr. 8, 2010

(30) Foreign Application Priority Data

Oct. 7, 2008 (JP) ................................ 2008-260789

(51) Int. Cl.
*B60Q 1/00* (2006.01)

(52) U.S. Cl. ......... 362/545; 362/538; 362/539; 362/516

(58) Field of Classification Search .......... 362/535–536, 362/516, 519, 543

See application file for complete search history.

(56) References Cited

U.S. PATENT DOCUMENTS

2005/0180157 A1 8/2005 Watanabe et al.

FOREIGN PATENT DOCUMENTS

EP 0926772 A2 6/1999
JP 2005-209537 A 8/2005

OTHER PUBLICATIONS

Extended European Search Report dated Jan. 19, 2010.

*Primary Examiner* — Tracie Y Green
(74) *Attorney, Agent, or Firm* — Sughrue Mion, PLLC

(57) ABSTRACT

A vehicle lamp is provided with: a light source unit containing a light source, a feeder socket having a male terminal conductively connected to the light source, and a feeder connector containing a female terminal conductively connected to the male terminal when inserted into the feeder socket and connected to an end of an electric wire; and a light source unit attaching section on which the light source unit is attached. The vehicle lamp further includes a holding member that is attached at a rear end of the feeder connector, bends the electric wire against a direction for inserting the feeder connector and can be grasped in inserting the feeder connector.

3 Claims, 5 Drawing Sheets

VEHICLE LAMP INCLUDING HOLDING MEMBER

BACKGROUND OF THE INVENTION

1. Field of the Invention

The present invention relates to a vehicle lamp including a feeder connector to be inserted into a feeder socket conductively connected to a light source.

2. Background Art

A known example of conventional vehicle lamps includes a light source unit that supplies power to a light emitting diode working as a light source by inserting a feeder plug as a feeder connector into an LED module having an input section as a feeder socket (see, for example, JP-A-2005-209537).

In the vehicle lamp disclosed in JP-A-2005-209537, however, the feeder connector is comparatively small and hence is difficult for an operator to grasp with his/her fingers during an inserting operation, and therefore, it is difficult to efficiently insert the feeder connector. Furthermore, it is difficult to check a state of the feeder connector inserted in the feeder socket.

Moreover, since a direction for leading each electric wire drawn from a rear end of the feeder connector is not restricted, it is troublesome to lead electric wires in a lighting chamber, which may make the electric wires get tangled.

SUMMARY OF THE INVENTION

One or more embodiments of the invention provide a vehicle lamp in which a feeder connector can be more efficiently inserted and a working property in leading an electric wire can be improved.

In accordance with one or more embodiments of the invention, a vehicle lamp is provided with: a lighting chamber formed by a lamp body having a front opening and a front cover provided on the front opening; a light source unit disposed within the lighting chamber, the light source unit including a light source, a feeder socket having a first terminal conductively connected to the light source, and a feeder connector containing a second terminal conductively connected to the first terminal when the feeder connector is inserted into the feeder socket and connected to an end of an electric wire; a unit attaching section on which the light source unit is attached; and a holding member attached at a rear end of the feeder connector, wherein the holding member is capable of being grasped in an inserting operation of the holding member into the feeder connector.

According to the vehicle lamp having the above-described structure, since the holding member that can be easily grasped with fingers is attached at the rear end of the feeder connector, an operator can definitely and easily insert the feeder connector into the feeder socket without directly grasping the feeder connector with a small size. Thus, the working property in inserting the feeder connector can be improved.

In the vehicle lamp having the above-described structure, the holding member may include a wire holding section that clasps the electric wire drawn from the rear end of the feeder connector and bends the electric wire to a direction for inserting the feeder connector.

According to the vehicle lamp having the above-described structure, the end of the electric wire is clasped within the wire holding section of the holding member, and therefore, there is no need for an operator to directly touch the electric wire in inserting the feeder connector into the feeder socket. Therefore, the second terminal can be prevented from coming off from the feeder connector, which problem is otherwise caused by pulling the electric wire by mistake during the insertion.

Furthermore, since the holding member is attached at the rear end of the feeder connector, the electric wire can be bent in a prescribed direction against the direction for inserting the feeder connector, and hence, the electric wire can be prevented from tangling. As a result, the working property in leading the electric wire can be improved.

In the vehicle lamp having the above-described structure, the holding member may have a terminal engaging piece that enters the feeder connector for preventing the second terminal from disengaging and a flexible engaging piece that is engaged with the feeder connector.

According to the vehicle lamp having the above-described structure, the terminal engaging piece of the holding member enters the feeder connector for preventing the second terminal from coming off and the flexible engaging piece is engaged on the outside of the feeder connector, so that the holding member can be fixed at the rear end of the feeder connector. As a result, the second terminal can be definitely prevented from coming off, and the second terminal connected to the end of the electric wire can be stably contained in the feeder connector.

According to the vehicle lamp of the embodiments, a feeder connector can be more efficiently inserted, and the working property in leading an electric wire can be improved.

Other aspects and advantages of the invention will be apparent from the following description, the drawings and the claims.

DETAILED DESCRIPTION OF THE EXEMPLARY EMBODIMENTS

An exemplary embodiment of the invention will now be described with reference to the accompanying drawings.

Figure 1:
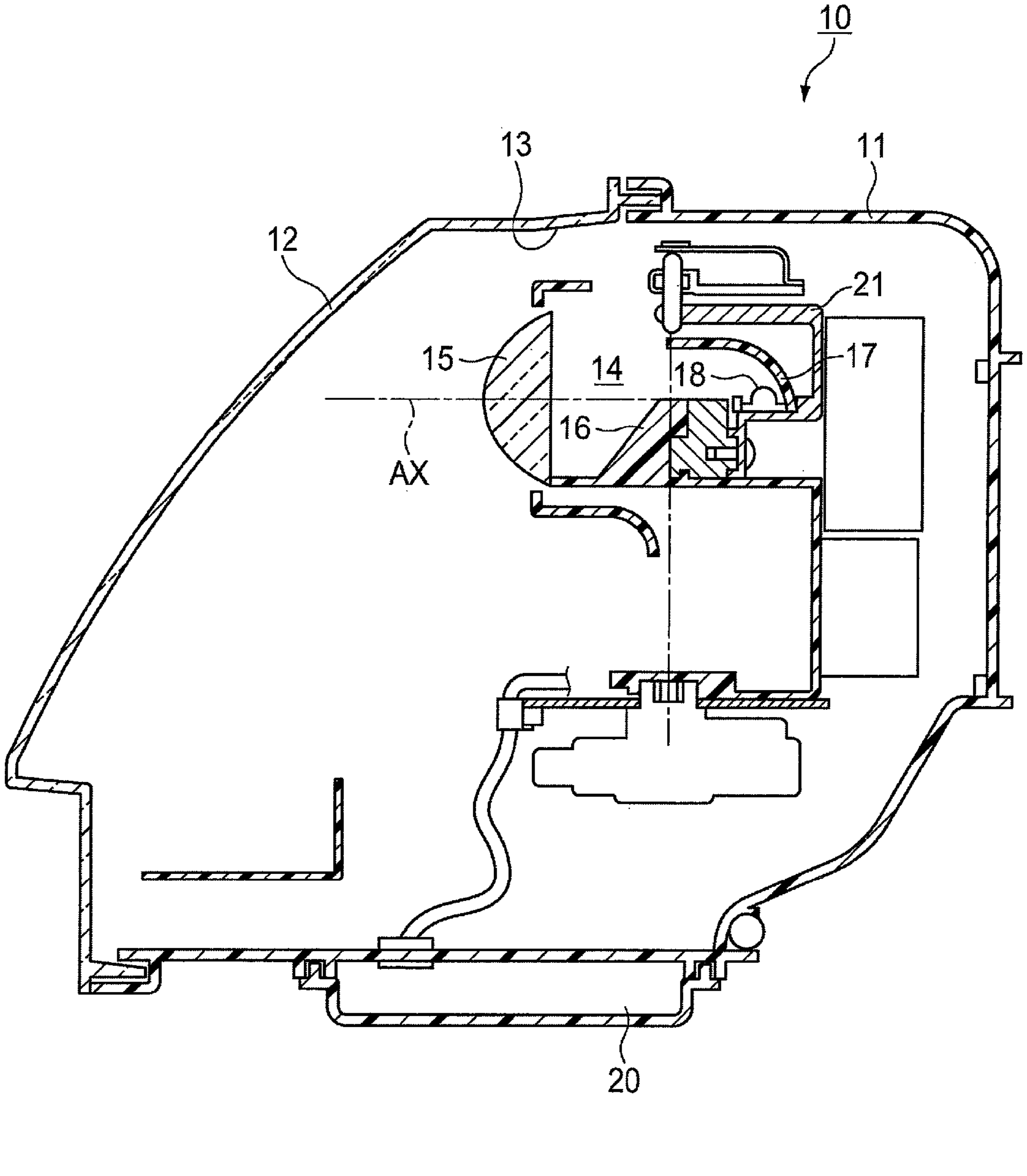
FIG. 1 is a vertical cross-sectional view of a vehicle lamp according to an exemplary embodiment of the invention.
Figure 2:
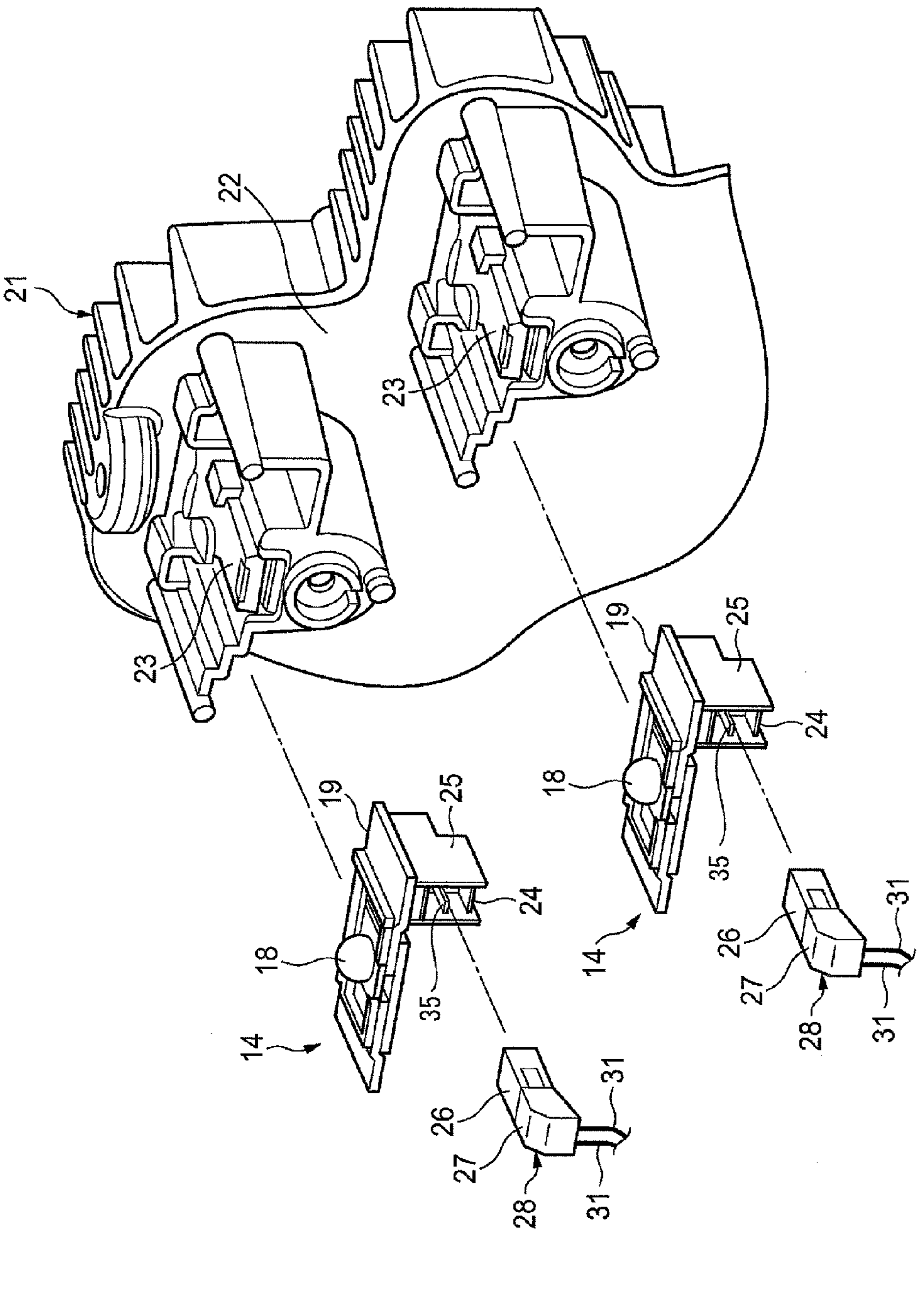
FIG. 2 is an exploded perspective view of a light source unit of FIG. 1.
Figure 3:
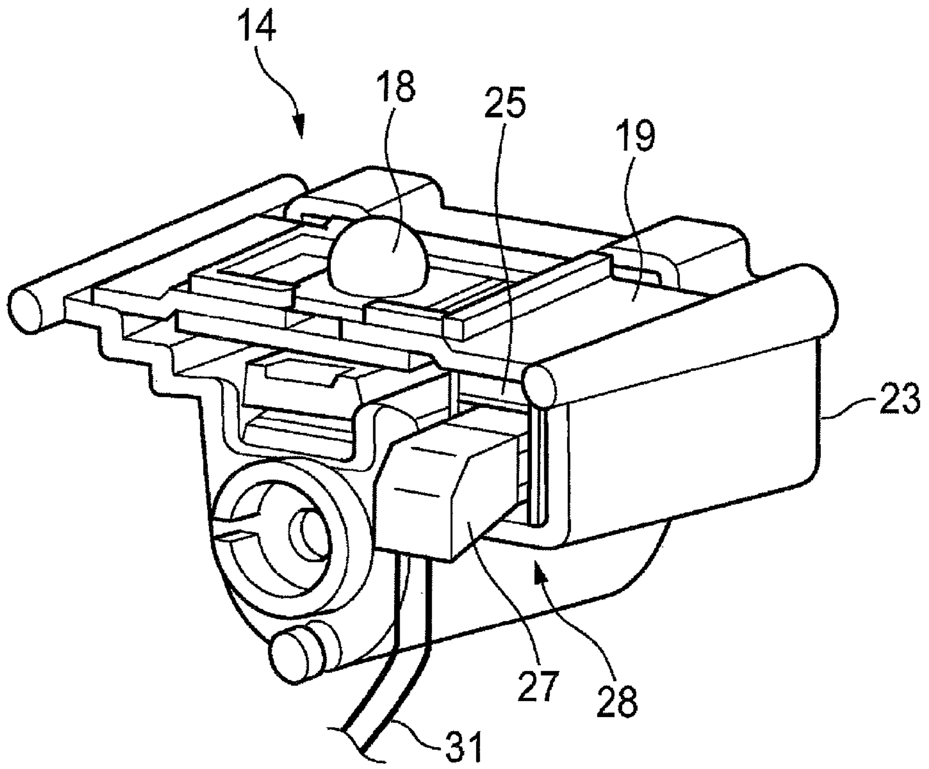
FIG. 3 is a perspective view of the appearance of the light source unit of FIG. 2 in an attached state.
Figure 4:
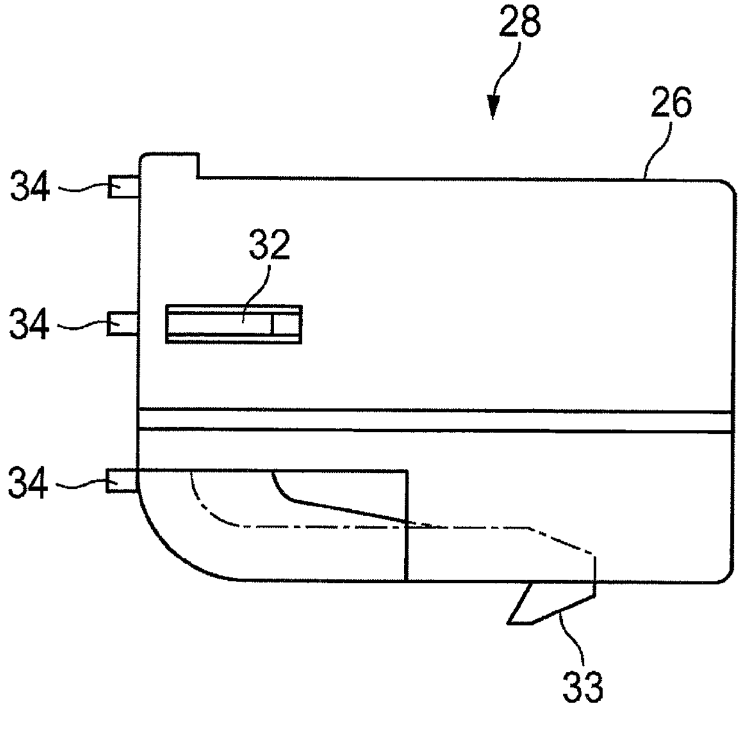
FIG. 4 is a side view of a feeder connector of FIG. 3.
Figure 5:
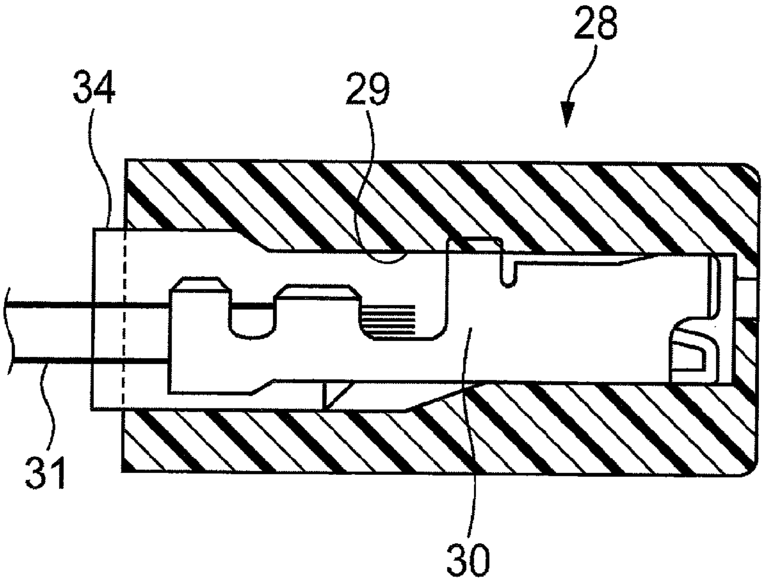
FIG. 5 is a vertical cross-sectional view of the feeder connector of FIG. 4.
Figure 6:
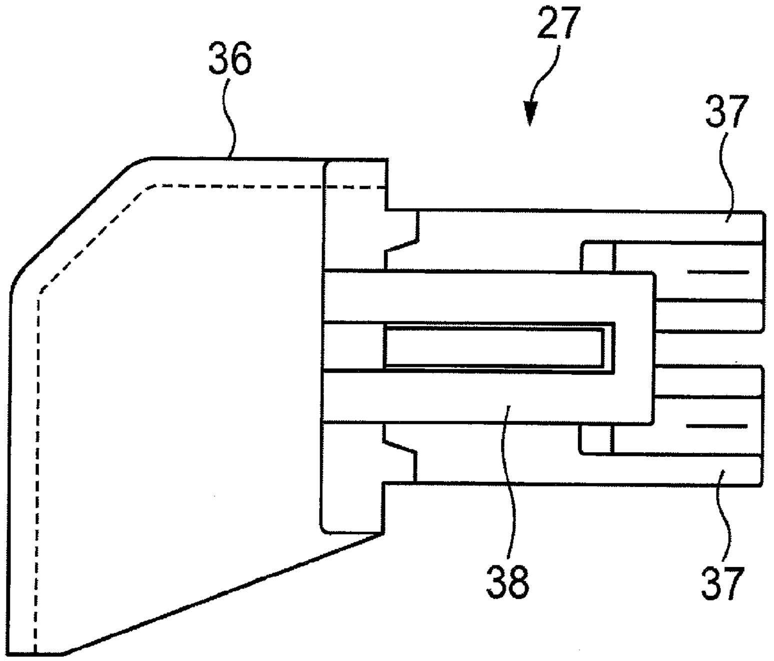
FIG. 6 is a side view of a holding member of the feeder connector of FIG. 3.
Figure 7:
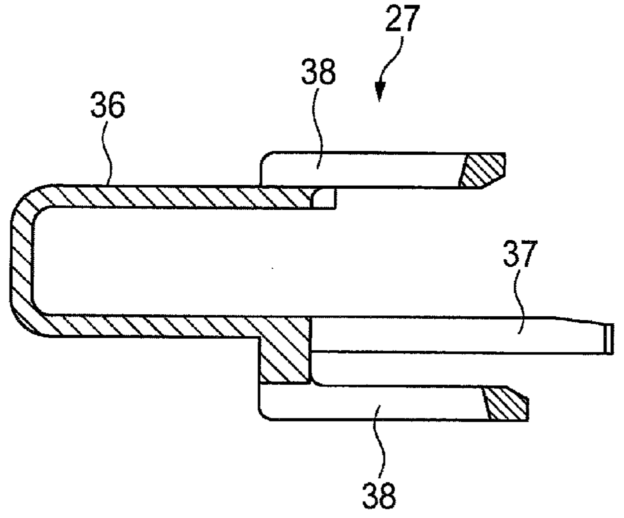
FIG. 7 is a horizontal cross-sectional view of the holding member of FIG. 6.
Figure 8:
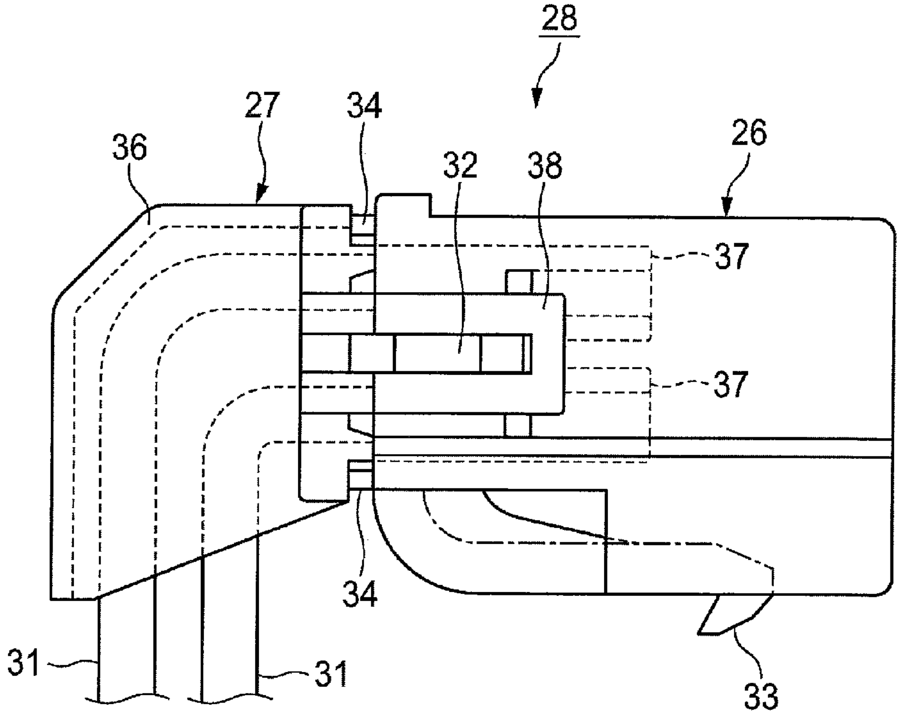
FIG. 8 is a side view of the holding member engaged with the feeder connector of FIG. 3.

FIG. 1 is a vertical cross-sectional view of a vehicle lamp according to the exemplary embodiment of the invention, FIG. 2 is an exploded perspective view of a light source unit of FIG. 1, FIG. 3 is a perspective view of an appearance of the light source unit of FIG. 2 in an attached state, FIG. 4 is a side view of a feeder connector of FIG. 3, FIG. 5 is a vertical cross-sectional view of the feeder connector of FIG. 4, FIG. 6 is a side view of a holding member of the feeder connector of FIG. 3, FIG. 7 is a horizontal cross-sectional view of the holding member of FIG. 6, and FIG. 8 is a side view of the holding member engaged with the feeder connector of FIG. 3.

As illustrated in FIG. 1, the vehicle lamp 10 according to the embodiment of the invention is a headlight unit including a lamp body 11 made of a resin and fixed on a vehicle body with its front side opened; a transparent front cover 12 colorless or in orange or another color mounted on the front opening of the lamp body 11; and a lighting chamber 13 formed by the lamp body 11 and the front cover 12.

The vehicle lamp 10 includes, in the lighting chamber 13, a lighting unit including a light source unit 14, a projection lens 15, a shade 16, a reflector 17, a lamp bracket 21 and the like, and further includes, on the bottom of the lamp body 11, a lighting circuit unit 20 that controls the light source unit 14.

As illustrated in FIGS. 2 and 3, the lamp bracket 21 is mounted in a rear portion within the lighting chamber 13 and includes a vertical panel section 22, and a plurality of radiation fins are provided on the rear face side of the vertical panel section 22 and light source unit attaching sections 23 for attaching a plurality of light source units 14 are provided in the same number as the light source units 14 on the front face side of the vertical panel 22.

Each light source unit 14 includes an LED 18 corresponding to a light source and an LED assembly case 19 on which the LED 18 is mounted. On a side portion of the LED assembly case 19, a feeder socket 25 opened on the front side and having a connector inserting section 24 for inserting a feeder connector 28 is integrally provided. Within the connector inserting section 24, a male terminal 35, that is, a first terminal, conductively connected to the LED 18 is protruded.

The feeder connector 28 includes a housing 26 to be inserted into the connector inserting section 24 and a substantially L-shaped holding member 27 attached to a rear end portion of the housing 26 and covering ends of electric wires 31.

As illustrated in FIGS. 4 and 5, the feeder connector 28 includes a hollow terminal cavity 29 formed within the housing 26, and a pair of female terminals 30, that is, a second terminal, are contained in this terminal cavity 29.

A bare core portion of one end of each electric wire 31 is caulked on the rear end of the female terminal 30 (which is illustrated in FIG. 5 in a state attained before caulking), and the other end of the electric wire is drawn to a side on which the holding member 27 is attached.

The feeder connector 28 has a pair of engaging projections 32 formed on both side faces in the rear portion of the housing 26 and has, on the bottom portion thereof, a flexible lance 33 to be engaged with an engaging recess not shown formed on the bottom of the feeder socket 25.

Furthermore, a plurality of projections 34 are provided at the rear end of the housing 26 so as to stably attach the housing 26 onto the holding member 27 by making the area in contact with the holding member 27 small.

As illustrated in FIGS. 6 and 7, the holding member 27 is made of a flexible resin material, has a wire holding section 36 on its rear side illustrated on the left hand side in the drawing, and has two terminal engaging pieces 37 disposed inside and a pair of flexible engaging pieces 38 disposed outside on its front side illustrated on the right hand side in the drawing.

The wire holding section 36 includes a wire clasping face in, for example, a substantially U-shaped cross-section easily grasped with a thumb and a forefinger, so that the electric wires 31 can be clasped with the U-shaped wire clasping face. Also, a lower portion of the wire holding section 36 is opened, and the electric wires 31 are led through this opened portion by an operator so as to be electrically connected to, for example, the lighting circuit unit 20.

As illustrated in FIG. 8, the procedure for attaching the feeder connector 28 is as follows: The two female terminals 30 connected to the ends of the electric wires 31 are contained in the terminal cavity 29 within the housing 26. Thereafter, the holding member 27 is attached so as to cover the electric wires 31 drawn from the rear end side of the housing 26 corresponding to the left hand side in the drawing.

At this point, an operator grasps the side faces of the wire holding section 36 of the holding member 27 with his/her fingers before inserting the terminal engaging pieces 37 into a gap formed above the female terminals 30 within the terminal cavity 29 disposed at the rear end of the housing 26. Then, the holding member 27 is inserted so as to make the tips of the terminal engaging pieces 37 come into contact with the female terminals 30, and the pair of flexible engaging pieces 38 are engaged with the engaging projections 32 disposed on the side faces of the housing 26.

Thus, with the front end of the wire holding section 36 in contact with the projections 34 of the housing 26, the holding member 27 is fixed on the rear end portion of the feeder connector 28. At this point, since the tips of the terminal engaging pieces 37 are in contact with the female terminals 30, the female terminals 30 are prevented from coming off from the terminal cavity 29 and the drawn electric wires 31 are clasped by the wire holding section 36 with their drawn portions bent downward by substantially 90 degrees.

Then, the thus assembled feeder connector 28 is inserted into the connector inserting section 24 of the feeder socket 25 from the front side of the lamp body 11 with the side faces of the wire holding section 36 of the holding member 27 grasped with fingers. Thus, the LED 18 and the lighting circuit unit 20 are electrically connected to each other through the electric wires 31.

As described so far, according to the vehicle lamp 10 of the embodiment of the invention, an operator can easily grasp the holding member 27 so as to attach it onto the rear end of the feeder connector 28 and can definitely and easily insert the feeder connector 28 into the feeder socket 25 by grasping the holding member 27 without directly grasping the feeder connector 28 with the small size. Therefore, the working property in inserting the feeder connector 28 can be improved.

Furthermore, since the ends of the electric wires 31 are clasped within the wire holding section 36 of the holding member 27, there is no need for an operator to directly touch the electric wires 31 in inserting the feeder connector 28 into the feeder socket 25. Therefore, the female terminals 30 can be prevented from coming off from the feeder connector 28, which problem is otherwise caused by pulling the electric wires 31 by mistake during the insertion.

Moreover, since the holding member 27 is attached at the rear end of the feeder connector 28, the electric wires 31 can be bent against the direction for inserting the feeder connector 28, and therefore, the plural electric wires 31 can be prevented from tangling. As a result, the working property in leading the electric wires 31 can be improved.

In addition, the terminal engaging pieces 37 of the holding member 27 enter the feeder connector 28 so as to prevent the female terminals 30 from coming off and the flexible engaging pieces 38 are engaged on the outside of the feeder connector 28, so that the holding member 27 can be fixed at the rear end of the feeder connector 28. As a result, the female terminals 30 can be definitely prevented from coming off, and the female terminals 30 connected to the ends of the electric wires 31 can be stably contained within the feeder connector 28.

It is noted that the present invention is not limited to the aforementioned exemplary embodiment but may be appropriately modified. In addition, the respective elements described in the embodiment are not specified in the materials, the shapes, the dimensions, the numerical values, the shapes, the numbers, the locations and the like, and may be arbitrarily determined as far as the invention can be practiced.

For example, the light source may be a bulb or the like instead of the LED illustrated in the drawings. Also, it goes without saying that the vehicle lamp is applicable to a rear combination lamp or the like instead of the headlight unit.

DESCRIPTION OF REFERENCE NUMERALS AND SIGNS

10 vehicle lamp
11 lamp body
12 front cover
13 lighting chamber
14 light source unit
18 LED (light source)
19 LED assembly case
21 lamp bracket
23 light source unit attaching section
24 connector inserting section
25 feeder socket
26 housing
27 holding member
28 feeder connector
30 female terminal (second terminal)
31 electric wire
35 male terminal (first terminal)
36 wire holding section
37 terminal engaging piece
38 flexible engaging piece

What is claimed is:

1. A vehicle lamp comprising:

a lighting chamber formed by a lamp body having a front opening and a front cover provided on the front opening;

a light source unit disposed within the lighting chamber, the light source unit including a light source, a feeder socket having a first terminal conductively connected to the light source, and a feeder connector containing a second terminal conductively connected to the first terminal when the feeder connector is inserted into the feeder socket and connected to an end of an electric wire;

a unit attaching section on which the light source unit is attached; and a holding member attached at a rear end of the feeder connector, wherein the holding member is capable of being grasped in an inserting operation of the holding member into the feeder connector;

wherein the holding member includes a wire holding section that clasps the electric wire drawn from the rear end of the feeder connector and bends the electric wire to a direction for inserting the feeder connector; and the holding member covers a bent portion of the electric wire from a front and a rear of the bent portion.

2. The vehicle lamp according to claim 1, wherein the holding member has a terminal engaging piece that enters the feeder connector for preventing the second terminal from disengaging and a flexible engaging piece that is engaged with the feeder connector.

3. The vehicle lamp according to claim 1, wherein the holding member includes a terminal engaging piece and a flexible engaging piece, and wherein the second terminal is prevented from being disengaged from the first terminal by an engagement of the flexible engaging piece with the feeder connector and an entering of the terminal engaging piece into the feeder connector.

* * * * *